(12) United States Patent
Lee

(10) Patent No.: US 8,800,151 B2
(45) Date of Patent: Aug. 12, 2014

(54) TUBE CUTTING DEVICE WITH RAPID SEPARABLE HANDLE

(76) Inventor: Tai-Hung Lee, Taichung (TW)

(*) Notice: Subject to any disclaimer, the term of this patent is extended or adjusted under 35 U.S.C. 154(b) by 213 days.

(21) Appl. No.: 13/424,317

(22) Filed: Mar. 19, 2012

(65) Prior Publication Data

US 2013/0152401 A1  Jun. 20, 2013

(30) Foreign Application Priority Data

Dec. 20, 2011  (TW) .............................. 100147500 A

(51) Int. Cl.
*B23D 21/06* (2006.01)

(52) U.S. Cl.
USPC .................................................. 30/95; 30/99

(58) Field of Classification Search
USPC ....................... 30/95, 96, 97, 98, 99, 101, 102
See application file for complete search history.

(56) References Cited

U.S. PATENT DOCUMENTS

| 7,013,567 | B2* | 3/2006 | Myers | .............................. 30/101 |
| 2004/0025351 | A1* | 2/2004 | Lee | .................................. 30/101 |
| 2011/0179649 | A1* | 7/2011 | Park | .................................. 30/95 |

* cited by examiner

*Primary Examiner* — Stephen Choi
(74) *Attorney, Agent, or Firm* — Cheng-Ju Chiang

(57) ABSTRACT

A tube cutting device with a rapid separable handle comprises a tube cutter and a handle. The tube cutter comprises a C-shaped housing, a one-way rotation part, and a limit part. The handle comprises a grip part, a C-shaped guiding seat, a separation control part, and a control button. The C-shaped guiding seat is for unidirectional rotation of the C-shaped housing via the one-way rotation part. In a combination position, it engages with the limit part so that the tube cutter and the handle are mutually fixed. In a separation position, it is separated from the limit part so that the tube cutter and the handle are separable from each other for independently perform tube cutting.

4 Claims, 6 Drawing Sheets

TUBE CUTTING DEVICE WITH RAPID SEPARABLE HANDLE

BACKGROUND OF THE INVENTION

1. Field of the Invention

The present invention relates to a tube cutting device with a rapid separable handle, particularly refers to a tube cutting device with a rapid separable handle having advantages of the handle being separable from or combinable with a tube cutter of the tube cutting device as needed, and quick, easy and convenient switch between different usage modes of the tube cutting device, and so on.

2. The Related Arts

With reference to FIGS. 6 and 7, traditional tube cutters 80 mainly comprise a main body 81 being a C-shaped structure, a rotary cutter 82 located at the main body 81, a plurality of rollers 83 located at the main body 81, and at least one lever arm 84 for moving the main body 81.

In this way, the tube cutter 80 is moved through the lever arm 84 to perform tube cutting operations on tubes (Public known as prior art, herein not shown in Figures) by using the rotary cutter 82 in cooperation with the plurality of rollers 83.

The tube cutter 80 mentioned above (Conventionally called as "mini-cutter" or "mini cut" by ordinary persons in related arts) is usually used to cut copper tubes. The advantages of the cutter 80 include easy to carry and quick operation. However, the disadvantage thereof is that when the tube is much longer, or the intended cutting position is located at middle of the object tube, user's hand 71 is necessary to continue to change gripping positions around the object tube during the process of tube cutting (For example, referring to change of gripping between a first position A1, a second position A2, a third position A3 and a fourth position A4 shown in FIG. 8). Such tube cutting process is quite time-consuming and inconvenient. Since user's hand must constantly change its gripping positions above and below the object tube, user's hand may be injured by hitting of the object tube during the process of moving up and down due to carelessness.

Therefore, it is necessary to develop new products to solve the disadvantages and problems mentioned above.

SUMMARY OF THE INVENTION

The main objective of the present invention is to provide a tube cutting device with a rapid separable handle. The device has advantages of the handle being separable from or combinable with a tube cutter of the tube cutting device as needed, and quick, easy and convenient switch between different usage modes of the tube cutting device. In particular, the present invention is intended to solve disadvantages and problems that when the traditional tube cutter is used to perform tube cutting at middle of the object tube to be cut, user's hand must constantly change its location back and forth upside and downside of the object tube in order to rotate the traditional tube cutter for tube cutting. It is quite time-consuming and inconvenient, and user's hand is likely to be injured by hitting of the object tube and other issues.

To solve the problems mentioned above, a tube cutting device with a rapid separable handle of the present invention is provided, and comprises a tube cutter and a handle. The tube cutter comprises a C-shaped housing, a first recess space, a one-way rotation part, and a limit part. The handle comprises a grip part, a C-shaped guiding seat, a separation control part, a control button and a second recess space. The C-shaped guiding seat is located at the grip part for guiding unidirectional rotation of the C-shaped housing via the one-way rotation part. The separation control part is disposed at the grip part and capable of switching between a combination position and a separation position. When located in the combination position, the separation control part engages with the limit part so that the tube cutter and the handle are mutually fixed to each other. When located in the separation position, the separation control part and the limit part are retracted away from each other so that the tube cutter and the handle are separated away from each other to independently perform tube cutting. The control button is disposed at the grip part and used to control the separation control part to switch between the combination position and the separation position. The second recess space corresponds to the first recess space.

DETAILED DESCRIPTION OF PREFERRED EMBODIMENT

Figure 1:
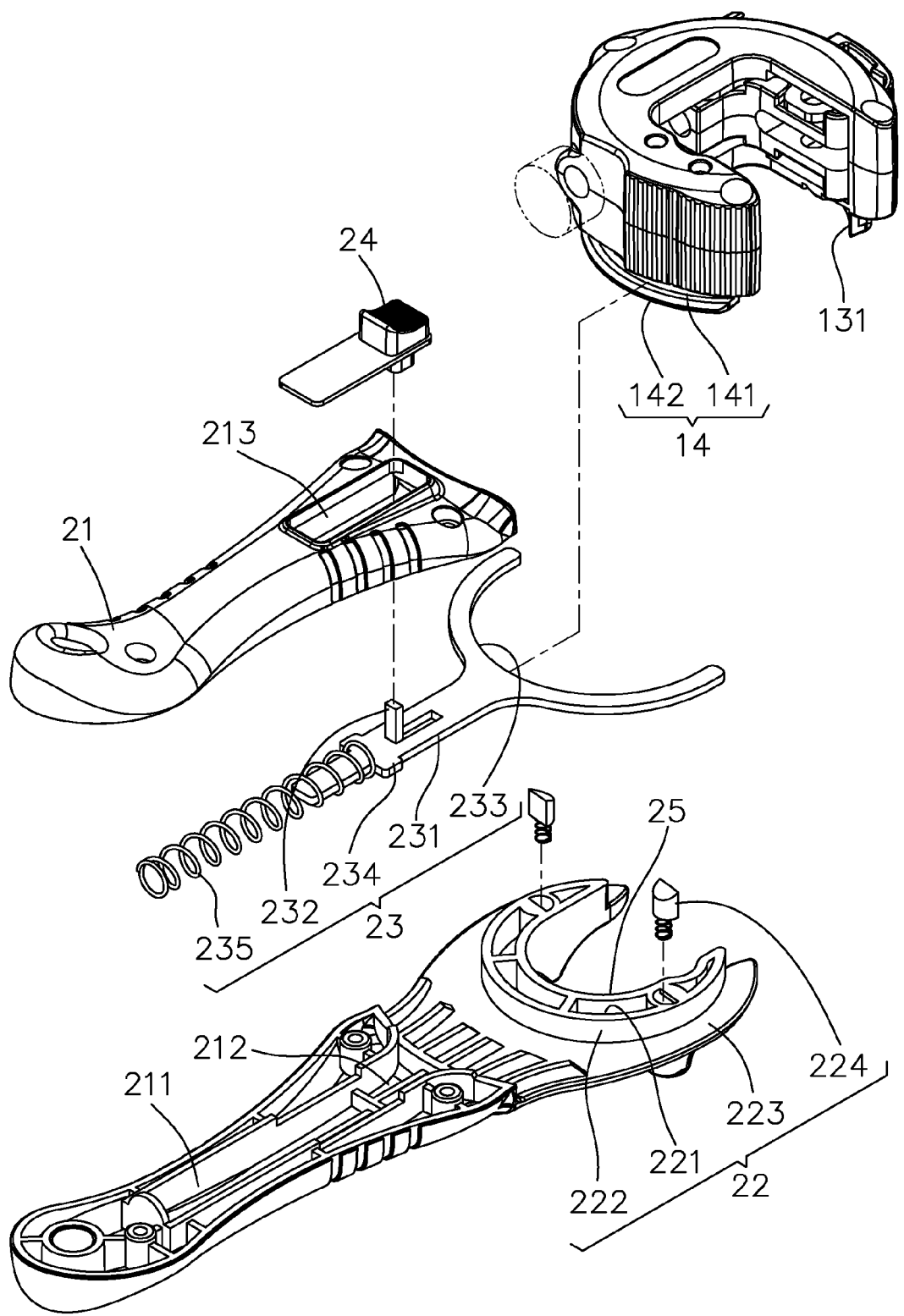
FIG. 1 shows an exploded schematic perspective view of the present invention from a first view angle.
Figure 2:
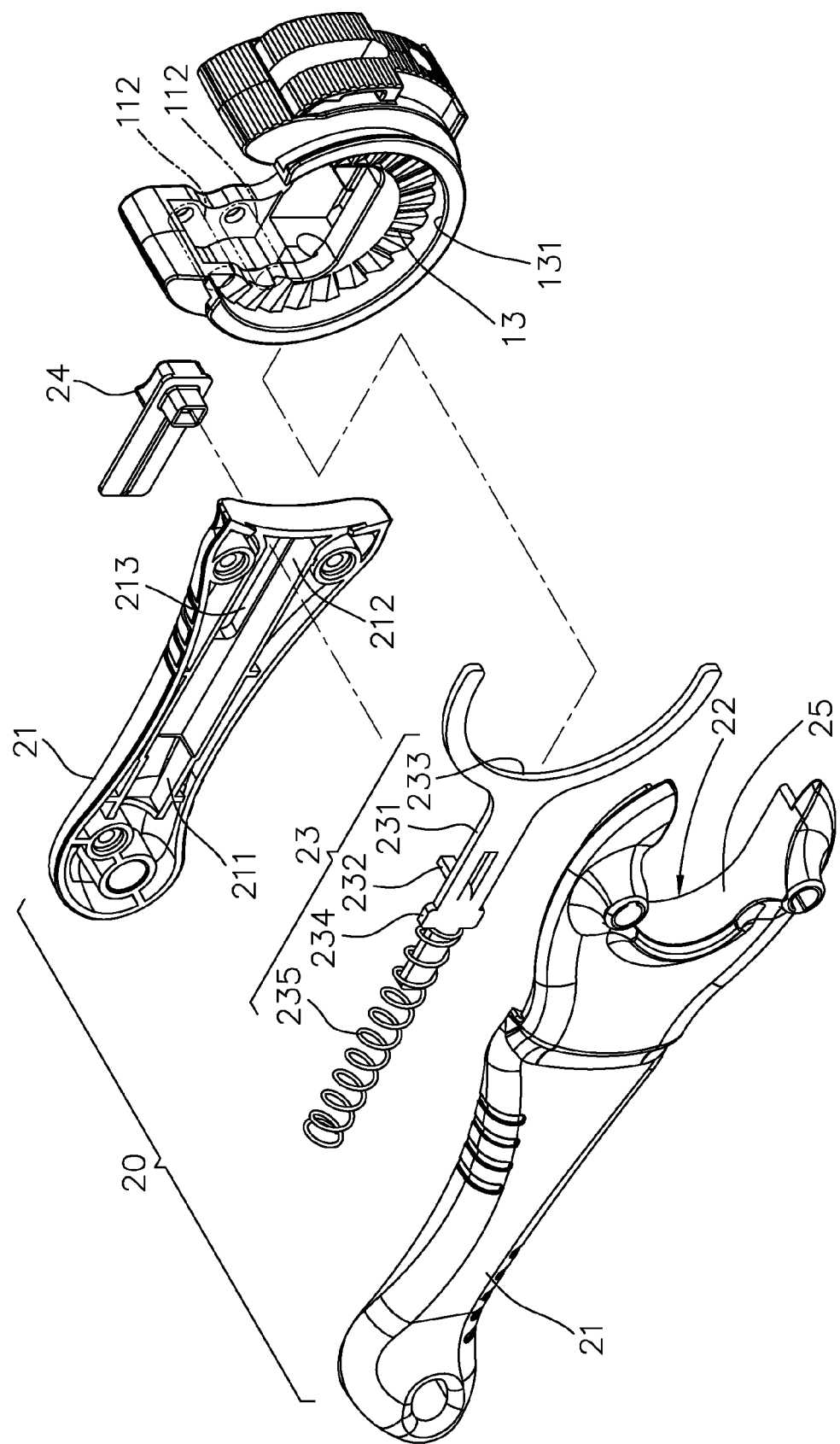
FIG. 2 shows an exploded schematic perspective view of the present invention from a second view angle.
Figure 3A:
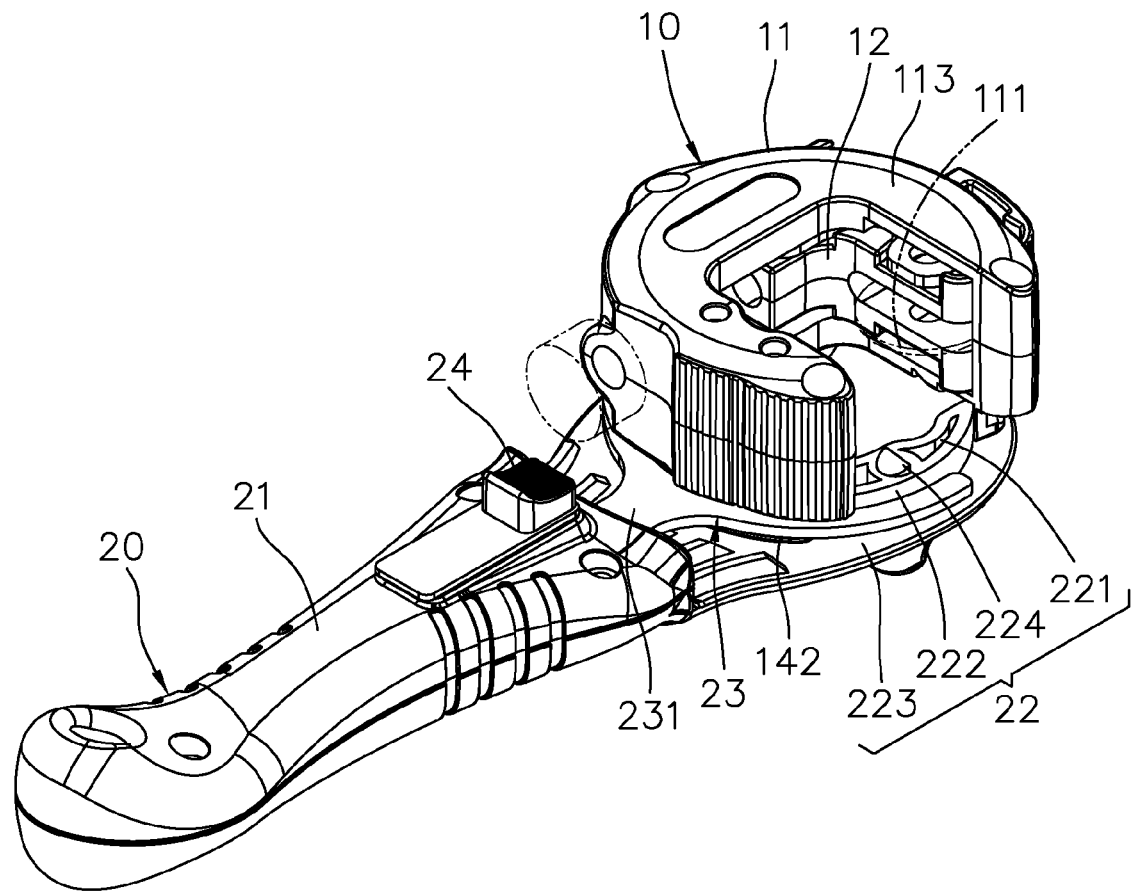
FIG. 3A shows a schematic perspective view of a tube cutter of the present invention in combination with a handle of the present invention.
Figure 3B:
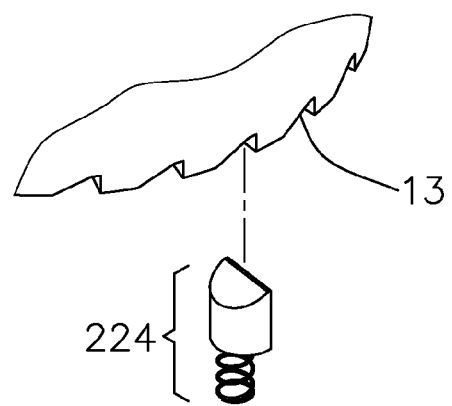
FIG. 3B is a schematic partial perspective view showing corresponding installation positions of a one-way rotation part and a one-way rotation limit element of the present invention.

With reference to FIGS. 1, 2, 3A and 3B, a tube cutting device with a rapid separable handle 20 of the present invention comprises a tube cutter 10 with a C-shaped housing 11, a first recess space 12, a one-way rotation part 13, and a limit part 14.

Figure 4:
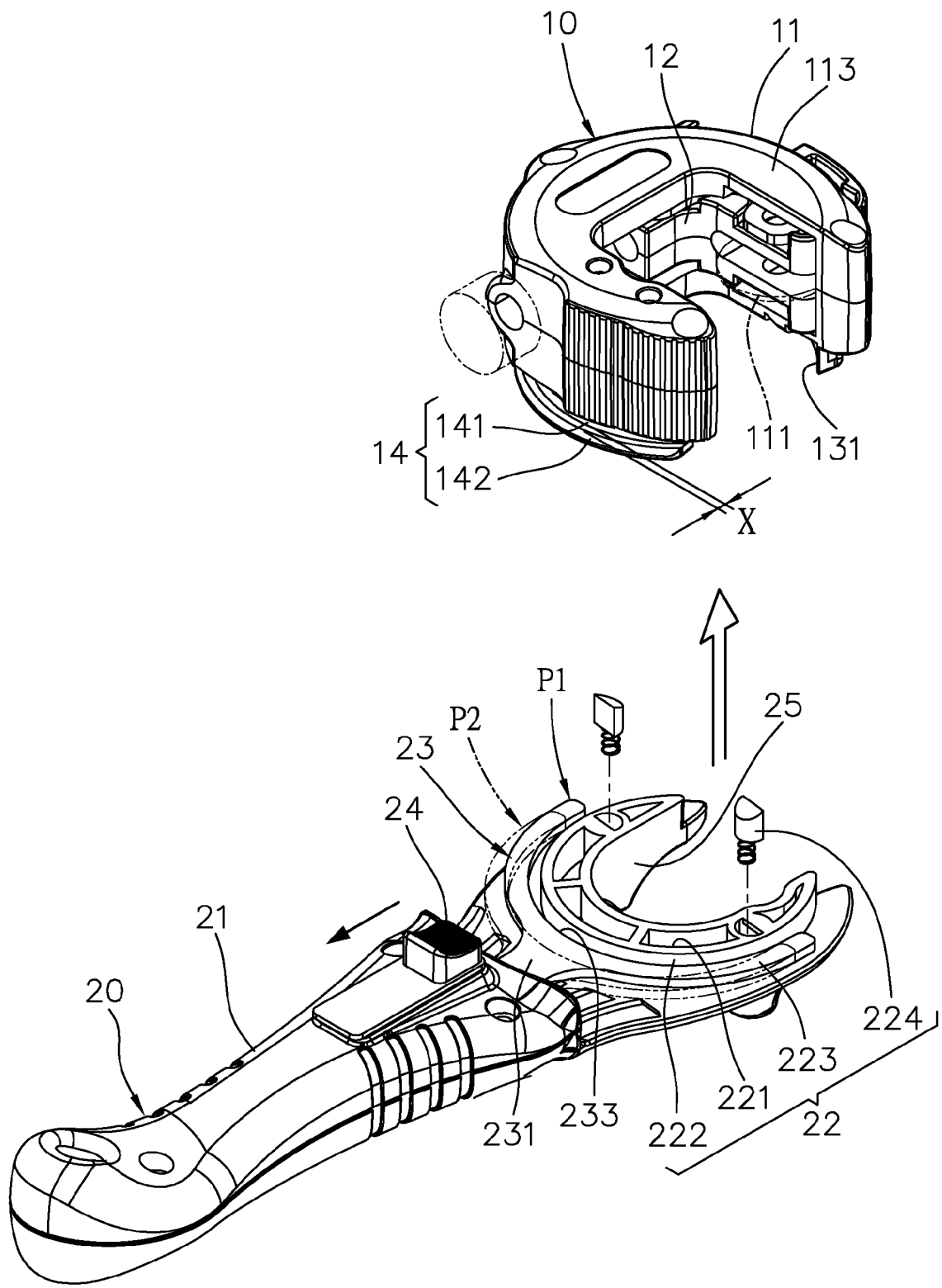
FIG. 4 shows a schematic perspective view of the tube cutter of the present invention being separable from the handle of the present invention.

The tube cutting device also comprises the handle 20. The handle 20 comprises a grip part 21, a C-shaped guiding seat 22, a separation control part 23, a control button 24 and a second recess space 25. The C-shaped guiding seat 22 is located at the grip part 21 for guiding unidirectional rotation of the C-shaped housing 11 via the one-way rotation part 13. The separation control part 23 is disposed at the grip part 21 and is capable of switching between a combination position P1 and a separation position P2 (Referring to FIG. 4). When located in the combination position P1, the separation control part 23 engages with the limit part 14 so that the tube cutter 10 and the handle 20 are mutually fixed to each other. When located in the separation position P2, the separation control part 23 and the limit part 14 are retracted away from each other so that the tube cutter 10 and the handle 20 are separated away from each other to independently perform tube cutting. The control button 24 is disposed at the grip part 21 and is used to control the separation control part 23 for switching between the combination position P1 and the separation position P2. The second recess space 25 is defined to be located correspondingly to the first recess space 12.

In practice, the C-shaped housing 11 comprises a rotating cutter 111, a plurality of rollers 112, two side surfaces 113 of the C-shaped housing 11 respectively formed as a rough C shaped plane and facing opposite to each other. The one-way rotation part 13 and the limit part 14 are located and exposed at one of the side surfaces 113.

The one-way rotation part 13 is a ring-like unidirectional gear tooth structure, and comprises a guiding inner surface 131 formed next to the gear tooth structure in order to guide the one-way rotation part 13 to engage with the C-shaped guiding seat 22.

The limit part 14 comprises a guiding groove 141 and a limit flange 142. The guiding groove 141 is in use of guidance of the separation control part 23 and the tube cutter 10 to mutually fix to and/or separate away from each other. The limit flange 142 is in use of limiting the separation control part 23 and the tube cutter 10 to be mutually fixed to and separated away from each other.

The grip part 21 is equipped with an accommodation space 211 extending from one end of the grip part 21 connecting the C-shaped guiding seat 22 to the other end of the grip part 21, a control opening 212 and a control button sliding channel 213. The C-shaped guiding seat 22 comprises a top surface 221, a guiding outer surface 222, a sliding surface 223 and at least a one-way rotation limit element 224. The separation control part 23 comprises a linear motion part 231, an extension driving part 232, a C-shaped limit part 233, an engaging part 234, and a resilient element 235. The arc extension range of the C-shaped limit part 233 is greater than 180 degrees so as to be able to withhold the tube cutter 10. The separation control part 23 is installed inside the accommodation space 211 so that at least the resilient element 235 of the separation control part 23 engages with the other end of the grip part 21. The linear motion part 231 engages within the control opening 212 and is capable of linear sliding relative to the control opening 212.

Among them, the one-way rotation part 13 corresponds to the top surface 221, and engages with the one-way rotation limit element 224. The guiding inner surface 131 engages with the guiding outer surface 222 and is capable of sliding relative to the guiding outer surface 222. The limit flange 142 engages with the sliding surface 223 and is capable of sliding relative to the sliding surface 223.

When the separation control part 23 is located in the combination position P1, the engaging part 234 is pushed by the resilient element 235, the C-shaped limit part 233 engages with the guiding groove 141, and the limit flange 142 is limited by the C-shaped limit part 233 so that the tube cutter 10 is capable of being rotated without being separated therefrom.

When the separation control part 23 is located in the separation position P2, the engaging part 234 reversely squeezes the resilient element 235, the C-shaped limit part 233 is separated out of the guiding groove 141, and the limit flange 142 is not limited by the C-shaped limit part 233 so that the tube cutter 10 is capable of separation therefrom.

There are two use modes of the present invention as follows:

[A] Combination use: First, user's hand holds the handle 20, and pushes rearward the control button 24 (Available to be pushed via user's thumb) along the control button sliding channel 213. The control button 24 drives the extension driving part 232 of the separation control part 23 to move the separation control part 23 rearward for a predetermined distance X. The predetermined distance X is set to be sufficient to separate the C-shaped limit part 233 out of the guiding groove 141 of the tube cutter 10, i.e., the separation control part 23 is located in the separation position P2. Then, the guiding inner surface 131 of the tube cutter 10 is placed on the C-shaped guiding seat 22. Finally, the control button 24 is released to allow the resilient element 235 pushing the engaging part 234 of the separation control part 23. The C-shaped limit part 233 restores to engage with the guiding groove 141 of the tube cutter 10, and the limit flange 142 of the tube cutter 10 is limited by the C-shaped limit part 233. The tube cutter 10 is capable of being rotated without separation therefrom, i.e., the separation control part 23 is located in the combination position P1. Afterwards, tube cutting can be performed. Due to combination of the tube cutter 10 with the handle 20, it is much smooth and convenient to operate tube cutting.

[b] Separation use: User's hand holds the handle 20 and pushes the control button 24 rearward along the control button sliding channel 213 with its thumb. The separation control part 23 is switched from the combination position P1 to the separation position P2. At this moment, the tube cutter 10 is capable of being removed from the C-shaped guiding seat 22, and is therefore separated from the handle 20. The tube cutter 10 can be used for tube cutting works smoothly and artfully.

Figure 5A:
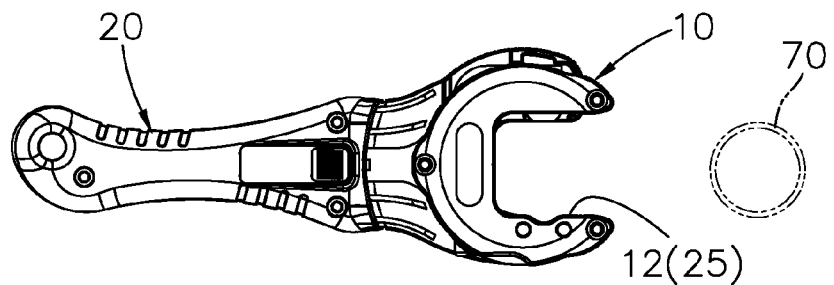
FIGS. 5A, 5B, 5C, 5D are schematic side views respectively showing operation processes of a tube cutting device of the present invention including an operation process thereof before clipping tubes, an operation process thereof after clipping tubes and idling rotating the handle, an operation process thereof for actively rotating the handle to push the tube cutter performing tube cutting, and an operation process thereof for returning the status of clipping tubes and idling rotating the handle.
Figure 5B:
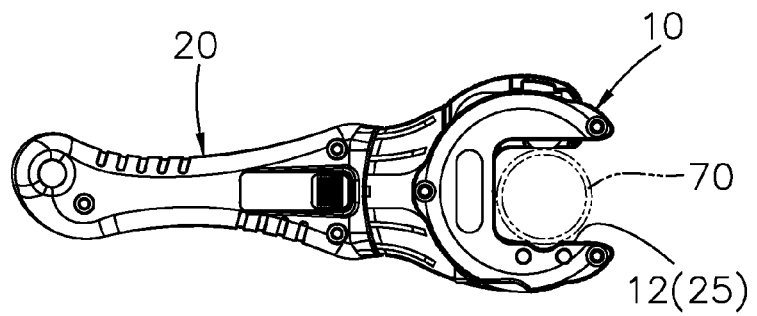
Figure 5C:
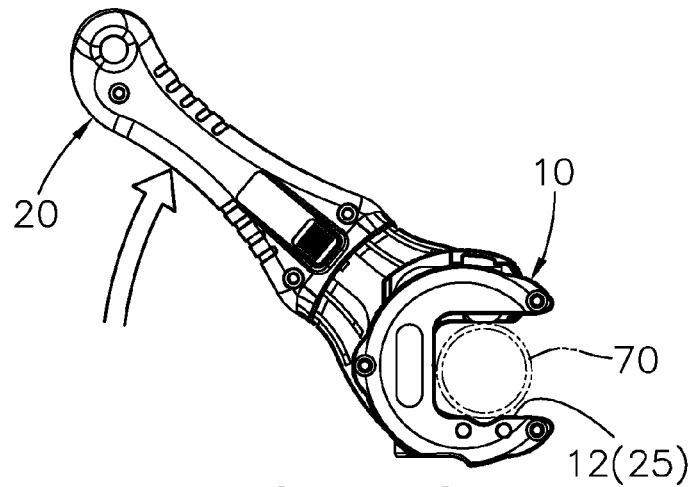
Figure 5D:
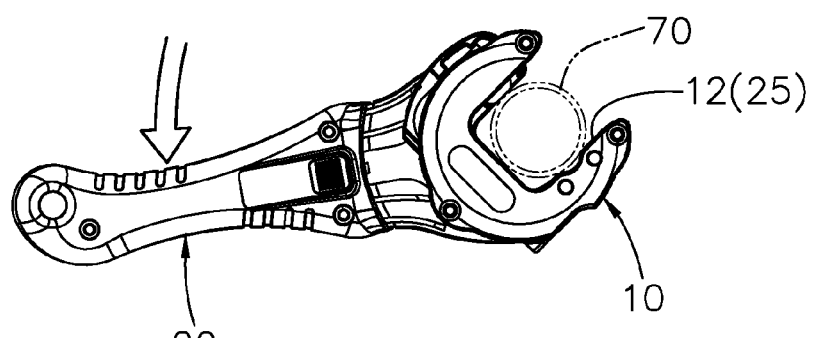
Figure 6:
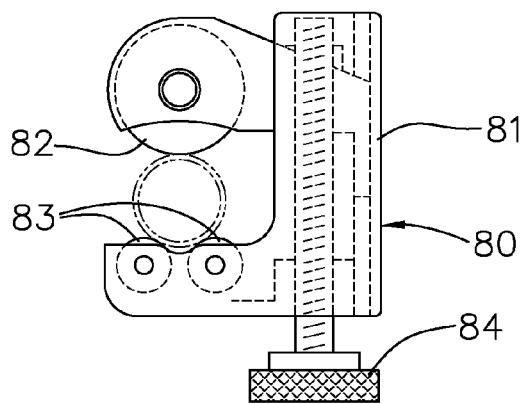
FIG. 6 shows a schematic side view of a traditional tube cutter.
Figure 7:
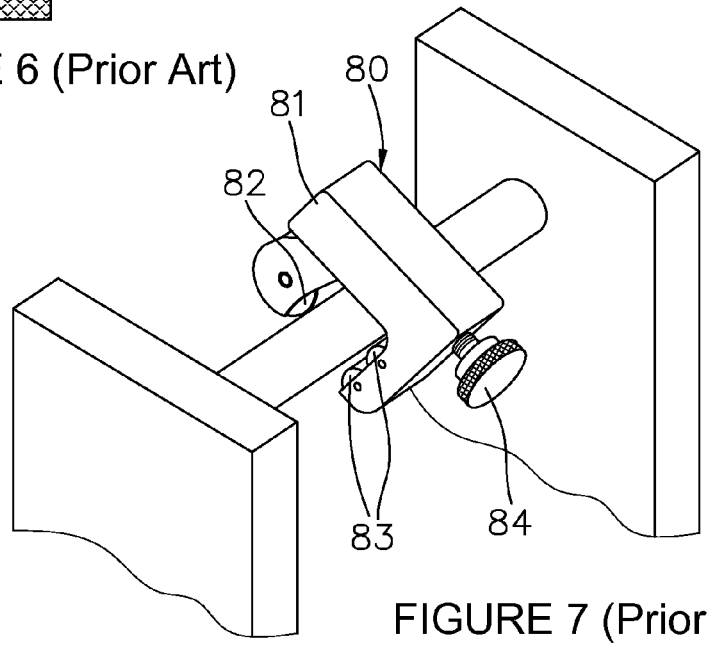
FIG. 7 shows a schematic perspective view of an operation embodiment of the tube cutter of FIG. 6.
Figure 8:
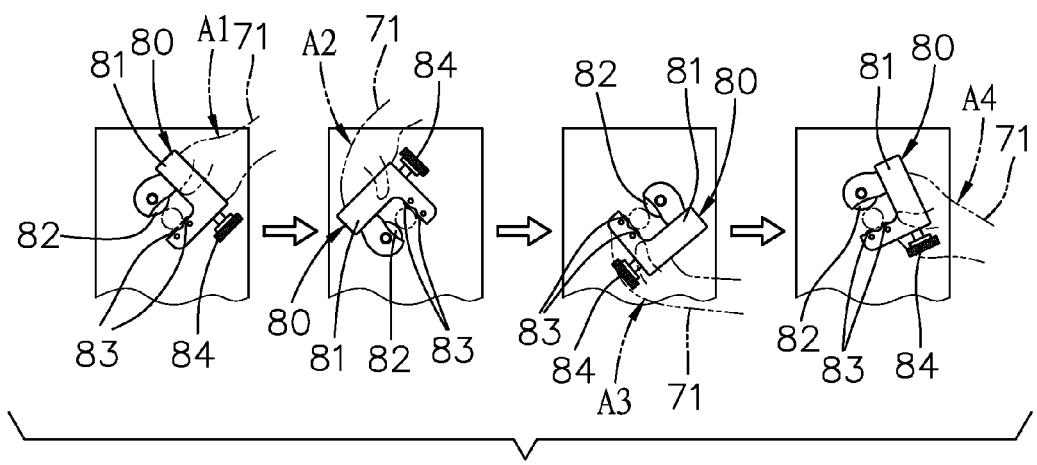
FIG. 8 shows schematic side views of an operation process of the tube cutter of FIG. 7.

As for tube cutting processes of the present invention, they are mentioned as follows. With reference to FIGS. 5A and 5B, first of all, an object tube 70 to be cut is placed within the first and second recess spaces 12 and 25, and is clamped to move the handle 20 for idle rotation thereof (Referring to FIG. 5C). Next, the handle 20 is actively rotated reversely in order to push the tube cutter 10 for tube cutting operations on the object tube 70, and then the handle 20 is moved for idle rotation again (Referring to FIG. 5D). As a result of repeating the above-mentioned, tube cutting of the object tube 70 will finally complete.

The advantages and efficacy of the present invention can be summarized as follows:

[1] The handle is capable of being separated from or combined with the tube cutter when needed. When it is needed to perform tube cutting operations at middle of the object tube 70, the handle 20 and the tube cutter 10 can be assembled as one. Since user's force is applied on the handle, it is no need for user's hands to change positions thereof upward and downward of the object tube 70. By using the one-way ratchet function of the present invention performed between the handle 20 and the tube cutter 10, the user can directly push the handle 20 back and forth to easily control the tube cutter 10 for tube cutting. When tube cutting is performed at an end of the object tube 70, the user can separate the handle 20 and the tube cutter 10 to use the tube cutter alone for smooth, artful and convenient use thereof. Therefore, the tube cutting device of the present invention is capable of being used in two selective modes of "combination use" and "separation use".

[2] Switch of different usage modes is fast, simple and convenient. If the user wants to switch the "combination use" mode to the "separation use" mode or switch the "separation use" mode to the "combination use" mode, such switching can be conveniently done simply by operating to move the control button rearward via user's thumb.

What is claimed is:

1. A tube cutting device with a rapid separable handle, comprising:
   a tube cutter, comprising a C-shaped housing, a first recess space, a one-way rotation part, and a limit part; and
   a handle, comprising:
      a grip part;
      a C-shaped guiding seat located at the grip part for guiding unidirectional rotation of the C-shaped housing via the one-way rotation part;
      a separation control part disposed at the grip part and capable of switching between a combination position and a separation position, when located in the combination position, the separation control part engaging with the limit part so that the tube cutter and the handle are mutually fixed to each other, when located in the separation position, the separation control part and the limit part being retracted away from each other so that the tube cutter and the handle are separated away from each other to independently perform tube cutting;
      a control button disposed at the grip part and used to control the separation control part to switch between the combination position and the separation position; and
      a second recess space defined to be located correspondingly to the first recess space;
   wherein the grip part is equipped with an accommodation space extending from one end of the grip part connecting the C-shaped guiding seat to the other end of the grip part, a control opening and a control button sliding channel, the C-shaped guiding seat comprises a top surface, a guiding outer surface, a sliding surface and at least a one-way rotation limit element, the separation control part comprises a linear motion part, an extension driving part, a C-shaped limit part, an engaging part, and a resilient element, the separation control part is installed inside the accommodation space so that at least the resilient element of the separation control part engages with the other end of the grip part, an arc extension range of the C-shaped limit part is greater than 180 degrees to withhold the tube cutter, the one-way rotation part corresponds to the top surface, and engages with the one-way rotation limit element, the guiding inner surface engages with the guiding outer surface and is capable of sliding relative to the guiding outer surface, the limit flange engages with the sliding surface and is capable of sliding relative to the sliding surface, when the separation control part is located in the combination position, the engaging part is pushed by the resilient element, the C-shaped limit part engages with the guiding groove, and the limit flange is limited by the C-shaped limit part so that the tube cutter is capable of being rotated without being separated therefrom, when the separation control part is located in the separation position, the engaging part reversely squeezes the resilient element, the C-shaped limit part is separated out of the guiding groove, and the limit flange is free from being limited by the C-shaped limit part so that the tube cutter is capable of being separated therefrom.

2. The tube cutting device as claimed in claim 1, wherein the C-shaped housing comprises a rotating cutter, a plurality of rollers, two side surfaces of the C-shaped housing respectively formed as a C shaped plane and facing opposite to each other, the one-way rotation part and the limit part are located and exposed at one of the side surfaces.

3. The tube cutting device as claimed in claim 1, wherein the one-way rotation part is a ring-like unidirectional gear tooth structure, and comprises a guiding inner surface formed next to the gear tooth structure in order to guide the one-way rotation part to engage with the C-shaped guiding seat.

4. The tube cutting device as claimed in claim 1, wherein the limit part comprises a guiding groove and a limit flange, the guiding groove is in use of guidance of the separation control part and the tube cutter to mutually fix to and separate away from each other, the limit flange is in use of limiting the separation control part and the tube cutter to mutually fix to and separate away from each other.

* * * * *